United States Patent Office 3,424,322
Patented Jan. 28, 1969

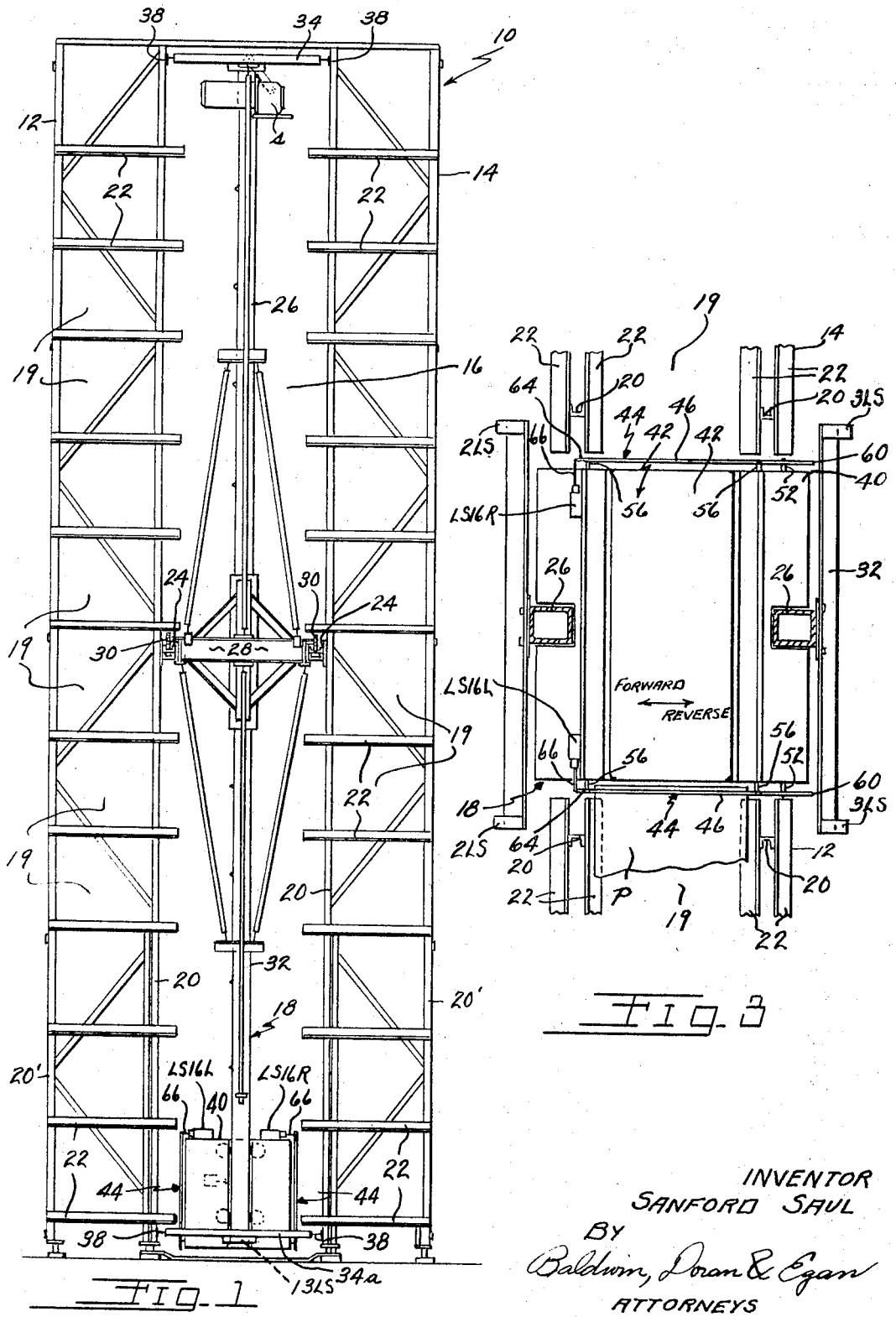

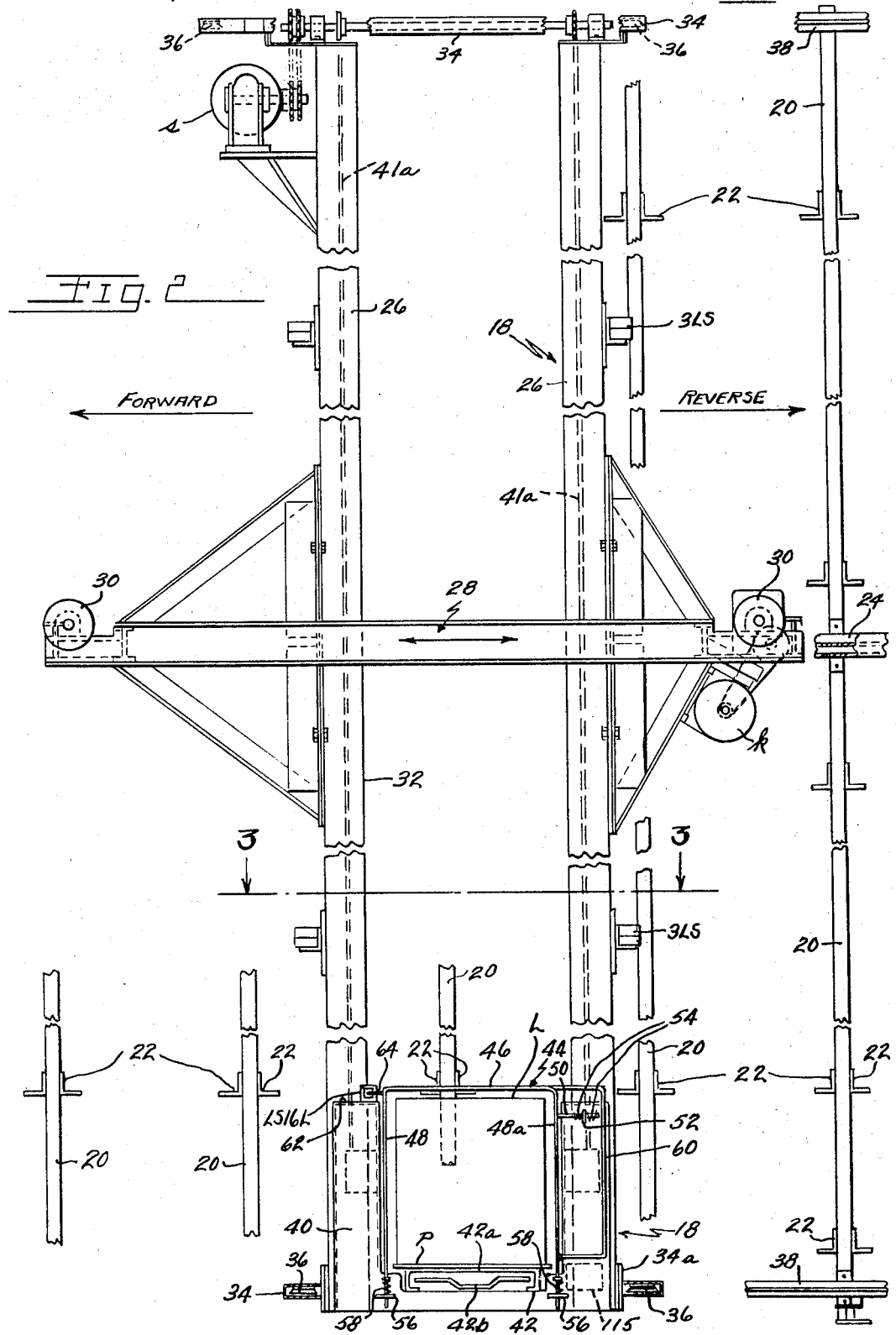

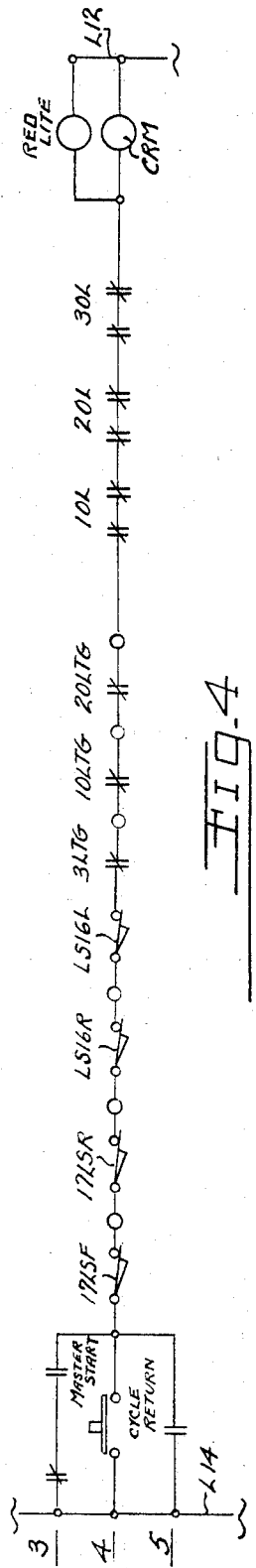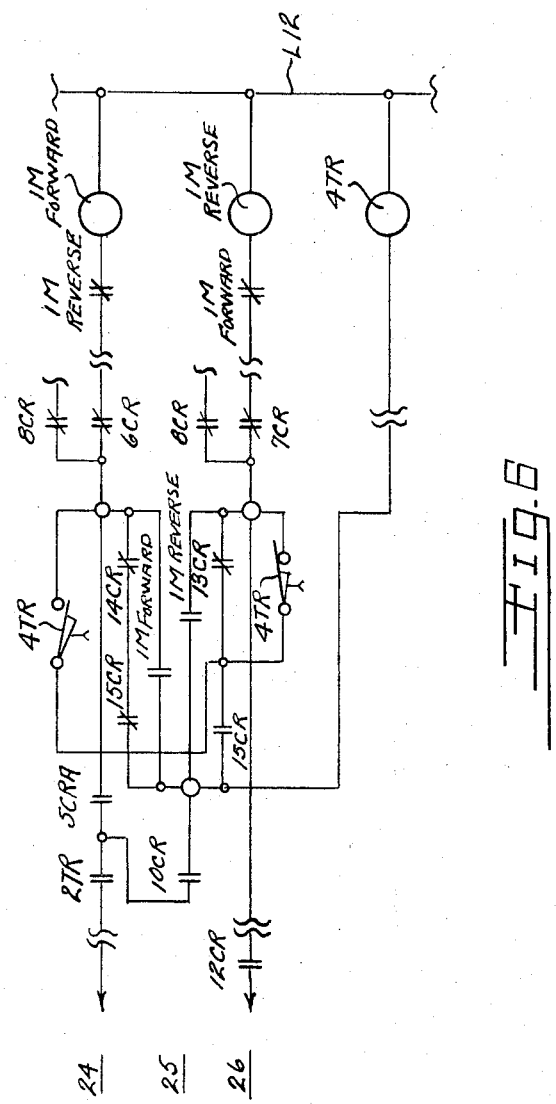

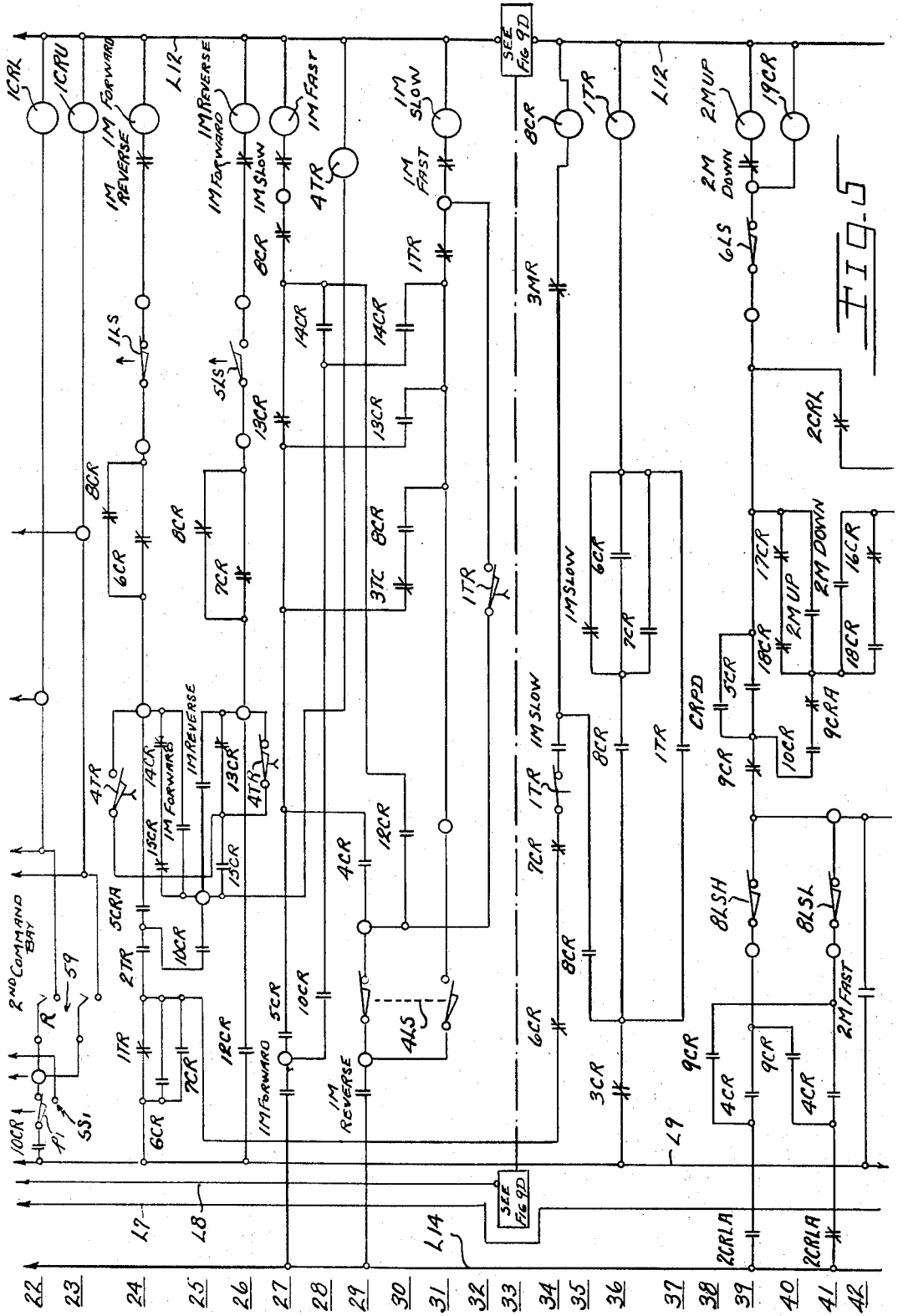

3,424,322
**AUTOMATIC WAREHOUSING SYSTEM
AND METHOD**
Sanford Saul, Cleveland, Ohio, assignor to The Triax Company, Cleveland, Ohio, a corporation of Ohio
Filed Dec. 15, 1965, Ser. No. 514,028
U.S. Cl. 214—16.4            9 Claims
Int. Cl. E04h 5/28; B66b 1/00

ABSTRACT OF THE DISCLOSURE

An automatic warehousing system for storing and unstoring loads from tiered bins including a powered load carrier movable through a load handling cycle sequentially to at least two load handling positions and wherein the load carrier has load sensing means thereon for sensing out of position loads in the storage bins, with control circuitry for the load carrier causing a predetermined distance horizontal movement of the load carrier away from the first load handling bin position after depositing of a load by the load carrier at the first bin positon and then return of the load carrier back to the first bin position, prior to movement of the load carrier to the next load handling bin position in the load handling cycle. During said predetermined distance horizontal movement if an out-of-position load condition exits at the first bin position, the sensing means on the load carrier senses such out-of-position load and halts further movement of the load carrier, thus preventing damage to the load carrier and/or to the storage bin structure and/or to the out-of-position load.

---

This invention relates in general to automatic warehousing systems for storing or unstoring loads by transferring them between a movable load carrier and a storage frame, and more particularly to a load detecting mechanism and method for stopping transferring motion of the load carrier in the event of an improperly positioned load, to prevent collision damage between the load carrier and the load and/or between the load and the storage frame.

This situation may occur especially where the load carrier at its first load depositing stop in the load handling cycle leaves a load in the storage frame but not fully placed therein, or which load is oversize or skewed and, therefore, which load projects from the storage frame into the travel zone of the load carrier. The invention is particularly adapted for use in the automatic warehousing system wherein the carrier has been programmed to complete a plurality of dispensing and/or storage movements in a loading cycle without intervening manual attendance and control, and wherein the carrier after it has placed a load in one location or bin in the storage frame is programmed for vertical movement, and as for example to a higher level in the storage frame, for removing a load from such higher level bin area of the storage frame.

In the copending U.S. patent application Ser. No. 418,048, filed Dec. 14, 1964 by Sanford Saul and entitled Electrical Control Circuit for an Automatic Warehousing System there is disclosed an automatic warehousing system and control circuitry therefor of the general type with which the present arrangement is adapted for use.

The present invention provides a load sensing device and associated control circuitry, for use with the system of the abovementioned pending application, which will cause the load carrier, after it has deposited a load at one location or bin in the storage frame, to move horizontally a predetermined distance with respect to the storage frame, so that if the load placed in the first location or bin in the storage frame happens to protrude into the operating space or travel zone of the load carrier, the sensing device associated with the load carrier will engage such protruding load and will be actuated, thereby causing shutting off of the motive power which drives the load carrier, and thus preventing its further movement. Accordingly, damage to the load carrier and/or to the storage frame, and/or to the load will be prevented.

Accordingly, it is an object of the present invention to provide a novel automatic warehousing system arrangement.

Another object of the invention is to prevent the load carrier of an automatic warehousing system from leaving the location of a load not fully placed into the storage frame structure, by moving generally horizontally across the face of the storage frame a predetermined distance, to sense a deposited load projecting improperly out of the storage frame.

Another object of the invention is to provide in an automatic warehousing system, a load detecting mechanism which reacts to a disarranged load in the storage frame, which has just been stored at a first location in the storage frame by the load carrier, and prevents collision between the load carrier and such disarranged load, where the load carrier has been programmed to move to a second location, and especially to a different level in the storage frame, after depositing its load at the first location therein.

A further object of the invention is to provide in an automatic warehousing system a load sensing device and associated control circuitry therefor which will cause the load carrier to move generally horizontally a predetermined distance after it has deposited a load in a first selected bin in the storage frame, to thereby cause actuation of the load sensing apparatus associated therewith in the event that the load deposited in the first bin extends into the travel zone of the load carrier, such actuation of the sensing apparatus causing shutting down of the motive power means which operates the load carrier, thus causing stopping of the latter.

A still further object of the invention is to provide in an automatic warehousing system wherein the motive powered load carrier comprises conveyor means movable in generally horizontal directions and elevator means movable in generally vertical directions, and extractor means movable generally transversely of the load carrier into and out of storage bins disposed along the travel zone of the load carrier, a load sensing mechanism including a generally inverted movable U-shaped frame which is disposed at a side of the load carrier in confronting closely spaced relation to the receiving ends of the storage bins, and with there being provided control means associated with the motive power means which drives the load carrier, to cause predetermined horizontal movement of the conveyor means with respect to the storage bins after depositing of a load by the extractor in the first selected bin of a loading cycle, and with there being control means associated with the sensing frame to cause cutting off of the motive power means and thus stopping of the load carrier, in the event that the load deposited in the first selected bin improperly projects out of the storage frame and actuates the sensing frame by engagement therewith, thus preventing damage to the load carrier, or to the storage bins, or to the improperly disposed load in said first bin.

Another object of the invention is to provide a novel method of storing a load in an automatic warehousing system, which includes predetermined horizontal movement of the load carrier and associated load sensing mechanism, so that if a load which has been just placed in the storage bin happens to project out of the storage bin into the travel zone of the load carrier, the load sensing mechanism will be actuated by such projecting load to cause a shutdown of the motive power means driving the load carrier, to thus stop the latter and prevent collision damage to the storage bin, to the load carrier, and to the load.

Other objects of the invention will be apparent from the following description taken in conjunction with the accompanying drawings wherein:

FIG. 1 is an end view of a storage frame comprising a plurality of tiered bins showing a load carrier associated therewith, with the load carrier having mounted thereto a load sensing device in accordance with the invention;

FIG. 2 is a fragmentary, broken side view of the load carrier and associated load sensing device;

FIG. 3 is fragmentary sectional plan view taken generally along the plane of line 3—3 FIG. 2, looking in the direction of the arrows;

FIG. 4 is a schematic and diagrammatic fragmentary illustration of a circuit including control means which may be used in conjunction with the load sensing device, for shutting down the powered motive means which is used to drive the load carrier, and therefore prevent further movement of the carrier, in the event that a load which has just been placed in a bin of the storage frame by the load carrier is projecting out of the bin into the travel zone of the load carrier and associated load sensing means, thereby preventing collision damage between the load carrier and such improperly positioned load; this fragmentary section of the circuit is adapted for substitution for lines 3, 4 and 5 of FIG. 9B of the drawings of the aforementioned U.S. pending patent application Ser. No. 418,048 of applicant, filed Dec. 14, 1964;

FIG. 5 is a schematic and diagrammatic fragmentary illustration of a portion of the control circuit of the warehouse mechanism which is adapted to control movement of the load carrier a predetermined distance in a generally horizontal direction after a load has been deposited by the carrier in a storage bin of the loading cycle, so that in the event that such load is projecting out of the bin into the travel zone of the load carrier, the sensing means will engage such load and actuate the aforementioned control means for stopping application of power to the load carrier; this drawing FIG. 5 is generally identical to FIG. 9C of the drawings of the aforementioned copending U.S. patent application Ser. No. 418,-048, except for about lines 24 through 27 of the circuitry disclosed in said FIG. 9C, which changed circuitry illustrates the control arrangement for providing the aforementioned generally horizontal movement of the load carrier after completion of the depositing of a load in the storage bin of the loading cycle, so that in the event that such deposited load is projecting into the travel zone of the carrier, the sensing means will be actuated to thereby terminate the application of power to the carrier;

FIG. 6 is a schematic and diagrammatic fragmentary illustration of the portion of the circuitry of FIG. 5 which has been changed from about lines 24 through 27 of said FIG. 9C circuitry of U.S. application Ser. No. 418,048, to more closely show the changes in FIG. 5 as compared to said FIG. 9C for providing said predetermined horizontal movement of the load carrier after the completion of the depositing of a load at a first load receiving bin in the handling cycle.

Referring now again to the drawings and particularly to FIGS. 1, 2 and 3 thereof, the automatic warehousing system may comprise a storage frame 10 having generally parallel storage frame section 12 and 14, defining between them an aisle 16, so as to permit a motorized load carrier, indicated generally as at 18, to be moved along the aisle or travel zone 16, and to insert and/or withdraw a load or articles from the storage bins 19 formed by storage sections 12 and 14. As shown each storage section may be constructed of a plurality of vertically extending posts 20, 20' spaced apart by a plurality of generally horizontally extending load supporting rails 22 defining a plurality of storage bins. As aforementioned the instant arrangement of warehousing system is generally similar to that disclosed in applicant's copending U.S. patent application Ser. No. 418,048, and reference made be had thereto to for a more detailed description of such storage bin arrangement.

As can be seen in FIG. 1 the aisle sides of the storage sections 12 and 14 may be provided with a pair of generally horizontally extending rails 24 defining tracks providing for supporting the load carrier 18 as it is moved therealong within the aisle or travel zone 16. Rails or tracks 24 may be provided substantially midway between the top and bottom of the storage frame 10.

The load carrier 18 may comprise an upright mast formed with a pair of generally vertically extending track members 26 (FIGS. 2 and 3) with the mast structure being secured to an intermediate carriage frame 28 attached thereto. Carriage frame 28 bridges the distance across aisle 16 and may have wheels 30 at the sides thereof, which are disposed in rolling engagement in the tracks 24, thus supporting the load carrier 18 on the tracks 24 for horizontal movement. Such horizontally movable structure of the load carrier will be hereinafter referred to as conveyor mechanism or means 32. The upper and lower ends of the mast may be provided with frames 34, 34a, respectively, and with generally horizontally rotatable pulleys or rollers 36 mounted thereon and adapted for engagement with generally T-shaped (in the embodiment illustrated) rails 38 mounted on the aisle side of each storage section, thereby guiding the upper and lower ends of the load carrier 18 as it is moved along the aisle 16, thus providing three-point stabilizing engagement between the load carrier and the storage frame. Rails 24 and 38 preferably extend outwardly of the aisle 16 at the front end of the aisle, to enable the load carrier to be located completely in front of the storage sections 12 and 14 at a pick-up and discharge station, from which position the load carrier starts its movement into the aisle to deposit or pick up loads in the storage frame sections. Reference may be had to U.S. application 418,-048 for a more complete disclosure of such pick-up and discharge station. Electric motor $k$ (FIG. 2) mounted on the carriage frame 28 and operably coupled to wheels 30 may be provided for causing the horizontal movement of the conveyor means 32 of the load carrier structure.

A vertically movable elevator 40 is provided which is adapted for movement along the vertical tracks 26 of the mast to the full height of the storage frame. It will be understood that the elevator 40 moves through an opening in carriage frame 28, as the elevator moves to the upper portions of the storage frame above carriage frame 28, and thus is unimpeded in its vertical movement. Electric motor $s$ carried by mast structure 26 (FIG. 2) of the horizontally movable conveyor means 32 may be provided, with such motor $s$ being operably coupled to the elevator 40 as by flexible elements 41a, for actuating the elevator 40 in its vertical movement. The elevator 40 may include a load supporting platform or extractor 42 (FIG. 2) which provides an extensible table formed (in the embodiment illustrated) of upper and lower sections 42a and 42b (FIG. 2) supported one above the other, with such table being extendable in either of the opposed directions transversely to the direction of movement of the load carrier in its traveling zone, so as to locate the upper table section within either of the storage sections 12 or 14, effective to place the extensible in position to deposit or remove a load from a selected one of the storage bins. An electric motor 115 (FIG. 2) mounted on the elevator 40 and operably coupled to the extractor 42 may be provided for actuating the latter. Reference may be had to the aforementioned copending U.S. application 418,048 for a more detailed disclosure of such load supporting means or extensible platform 42.

When depositing an article or a load in one of the storage bins 19, the extractor or load supporting means 42 on the elevator 40 is located opposite the bin opening such that as the load is moved into the storage bin, the upper table section 42a of the extractor is slightly above the load supporting angle members 22 mounted on the sides of the bin. When the load is completely within the confines of the bin, the load supporting means 42 is lowered slightly to deposit the load pallet P (FIGS. 2 and 3) onto the supporting angle members, and to permit retraction of the upper and lower table sections 42a, 42b of the extractor back to their stacked position.

Conversely, when it is desired to remove a load or article from a bin, the extractor or load supporting means 42 on the elevator is located such that the upper table section 42a is extended into the bin slightly below the load supporting pallet. Thereafter, the load supporting means 42 is raised so as to lift the load pallet and associated load off its supporting angles, and the table is retracted to its stacked condition, preparatory to moving the load carrier to its next station.

The programmed operation or load handling cycle for the load carrier 18 may be controlled by an electrical control circuit as disclosed in the aforementioned copending U.S. patent application 418,048 whereby with the load carrier disposed at the pick-up and discharge station located in front of the storage frame, the load carrier 18 may be automatically moved into the aisle 16 and located sequentially opposite two storage bins in either of the storage sections 12 and 14 or the same storage section. At each storage bin during this control interval the extractor 42 may be actuated so that the load may be deposited or withdrawn from the bin.

For example, a load may be deposited into the bin at the first position, and a second load withdrawn from the bin at the second position and conveyed back to the aforementioned pickup and discharge station. Reference may be had to the aforementioned copending U.S. patent application 418,048 for a description of such complete control circuit for programming the operation of the load carrier motors k and s and the extractor motor 115.

Now in accordance with the instant invention, a load sensing or detecting means 44 is provided on opposite sides of the elevator 40, so that a load which may be projecting out of the storage frame into the aisle 16, will be sensed on either side of the load carrier. In the embodiment illustrated, the sensing means 44 are identical on such opposite sides of the load carrier and, therefore, the sensing means on only one side will be described in detail, it being understood that the sensing means on the other side is a mirror image of that on the described side.

Each sensing or detecting means may comprise an inverted generally U-shaped frame at the respective side of the load carrier, which frame is movably mounted to the vertically movable elevator 40, for generally floating action of the sensing frame in its own plane, in the event that it strikes an object or load projecting outwardly of the storage framework 10. Such sensing frame may comprise an elongated upper bar-like member 46 and spaced vertically extending bar-like members 48, 48a attached to the upper bar-like member. Projecting from one of the vertical frame members (e.g. 48a) may be a generally horizontal bar or mounting member 50 which is suitably attached to the associated vertical bar member, and which may pass through an enlarged opening in a laterally extending bracket 52 secured to the elevator 40. Disposed on either side of the bracket 52 may be a compression spring 54 encircling the mounting bar member 50 and which may resiliently engage the respective confronting face of the bracket 52. The outer end of each spring 54 may be suitably coupled, as by means of detents formed in the bar member, or by pins, to the bar, and thus resiliently hold or support the sensing framework 44 against generally sidewise movement and in a more or less floating action.

The lower ends of each of the vertical bar members 48, 48a may likewise extend through an enlarged opening in a bracket 56 projecting laterally from the elevator, and may be provided with a compression spring member 58 which is adapted to engage a confronting surface of the associated bracket, with the other end of the spring member being suitably coupled as by means of detents, or pins, or the like, to the associated vertical bar member, and thus resiliently support the sensing frame 44 for movement in a vertical plane and in a generally floating action. It will be understood that the openings through brackets 52 and 56 and through which the bar-like members 50 and 48, 48a extend, are sufficiently large to permit the aforedescribed sidewise and vertical floating action of the sensing frame 44. Frame 44 may also have a rectangular-like portion 60 (FIG. 2) rigidly secured thereto and projecting rearwardly therefrom in the plane of the sensing frame 44. As can be seen from FIG. 2, member 46 of sensing frame 44 is preferably disposed slightly above the upper extremity 62 of elevator 40 and above the upper extremity of the load L on the pallet P, while vertical bar members 48, 48a are disposed slightly inwardly of the inner side extremities of the elevator 40 and outwardly of the side extremities of the load L and pallet P, and outwardly of the side extremities of the extractor 42. Thus the extractor will move the pallet P and associated load L through the sensing frame 44 to place the load and pallet in a selected bin of the storage frame.

Disposed adjacent the upper end of the frame, there may be provided a rigid bracket member 64 (FIG. 2) projecting forwardly therefrom, with such bracket member being preferably flexibly coupled to a control member or limit switch LS16L or LS16R (FIGS. 2 and 3) which is mounted on the elevator 40. The limit switch LS16L or LS16R may be of the type shown and described in the copending U.S. patent application Ser. No. 427,824, filed Jan. 25, 1965 by Anthony R. Chasar, and entitled Load Sensing Apparatus, and more particularly as shown in FIG. 9 of such copending patent application. In other words, the limit switch may have a wobble stick or rod type actuating mechanism 66 (FIG. 3) for depressing the switch button thereof, with the wobble rod being pivotal in any direction radiating from the axis thereof, so that the switch will be actuated whenever the sensing frame 44 is moved in any direction, except outwardly from the switch in the direction of its own axis. Thus any movement of the sensing frame 44 occasioned by engagement of the sensing frame with a load or pallet projecting out of its storage bin into the travel zone of the load carrier, after the load has been deposited in the bin, will cause movement of the associated limit switch LS16L or LS16R and opening of the circuit thereof, thus cutting off power to the motor means driving the load carrier, and causing it to stop.

Accordingly, in the present instance, actuation of the respective limit switch LS16L or LS16R, will break the circuit to the master control relay CRM (FIG. 4) and cut off the current to the motors k, s and 115 for driving the load carrier 18.

Referring now to FIG. 5, there is shown a portion of the control circuit of the aforementioned copending U.S. patent application Ser. No. 418,048 which now embodies control means for causing predetermined generally horizontal movement of the conveyor means 32, after movement of the load carrier to a bin in the storage frame in the load handling cycle, and after completion of the depositing of a load by the load carrier at said bin has occurred. In FIG. 6, there is shown, in the interests of clarity, the changed portion of circuitry which is now embodied in the FIG. 5 circuitry, and as compared to the circuitry disclosed in FIG. 9C of U.S. patent application Ser. No. 414,048. Such portion of the circuit now includes a conventional time delay relay 4TR with the coil thereof coupled to the line conductor L12 and connected into line 25 of the FIG. 5 circuit intermediate the normally open contacts 10CR and 1M reverse, and with the normally open contacts of relay 4TR at one side thereof being coupled into line 24 of the FIG. 5 circuitry intermediate normally open contacts 5CRA and normally closed contacts 6CR. The other side of the normally open contacts of relay 4TR may be coupled intermediate normally open contacts 15CR and normally closed contacts 13CR. The normally closed contacts of relay 4TR at one side thereof may be coupled intermediate normally open contacts 15LR and normally closed contacts 13CR while the other side of such normally closed contacts of relay 4TR may be coupled to line 26 of the FIG. 5 circuitry intermediate normally open contacts 12CR and normally closed contacts 7CR.

Programming of the load carrier may be accomplished as described in applicant's aforementioned U.S. patent application Ser. No. 418,048 and particularly as commencing on p. 26 of the specification thereof, and thus will not be duplicated here.

Assuming now that the load carrier 18 has delivered a load to the selected bin in the selected storage bay and the extractor has moved back to its centered position as described in the aforementioned U.S. patent application 418,048 whereby the limit switch 13LS is actuated to thereby stop the extractor table movement in its centered position with respect to the elevator, 1M reverse, 1M slow, 4TR and 8CR are thus energized, and the conveyor 32 moves in a reverse direction toward the pick-up and discharge station at the front end of the storage frame and at slow speed, until the associated proximity switch 3LS of the respective storage bay is actuated upon its moving into the magnetic sensing area of the next upcoming bay post 20 of the storage frame, whereby the coil of relay 7CR is energized to effect energization of the coil of relay 1TR. The energization of relay 1TR de-energizes relay 1M slow, whereby power to the horizontal drive motor $k$ is terminated, and the carriage goes into coast until 4TR times out (approximately one to two seconds) to thereby de-energize 1M reverse and energize 1M forward.

When 1TR times out (and this occurs after the load carrier has swept past about the width of the post wherein the carrier has just deposited a load), then 1M slow is energized and the horizontal carriage moves in a forward direction until said proximity switch 3LS is de-activated upon leaving the magnetic sensing area of the energizing bay post, whereby 7CR, 1M forward and 1M slow are de-energized, as a result of which the power to the horizontal electro-responsive brake associated with drive motor $k$ is cut off, so that the brake engages the motor $k$ to stop horizontal movement of the conveyor. As set forth in the copending U.S. patent application 418,048, the proximity switches 3LS are carried on the conveyor mast (FIG. 2) so that they are deactivated at the instant the conveyor mechanism 32 is centered with respect to the selected bin of the respective storage bay.

It will be seen that during such predetermined reverse horizontal movement of the conveyor mechanism 32 toward the pickup and discharge station, if a load or its associated pallet P is projecting out the first bin of the loading cycle, and as shown in FIG. 3, such projecting load will engage the sensing frame 44 and thereby actuate the control switch LS16R or LS16L associated with the respective sensing frame on either side of the load carrier, thereby stopping the entire movement of the load carrier.

It will be understood that in the embodiment illustrated, such horizontal sensing movement of the load carrier and subsequent horizontal movement in the reverse direction will occur while vertical movement of the elevator 40 is occurring in the event that the load carrier has been programmed to move the elevator vertically with respect to the first load handling position and to a second vertically spaced bin in the loading cycle, after which a load may be retracted from the second bin in accordance with the loading cycle as described in the aforementioned copending U.S. patent application 418,048. If the load has been properly positioned at the first bin of the loading cycle, there will of course be no actuation of the sensing means 44 and thus no stopping of the load carrier drive motors.

From the foregoing description and accompanying drawings it will be seen that the invention provides a novel conveying and storage system which includes a load sensing or detecting means associated with the load carrier mechanism, and with the load carrier being adapted for movement in a generally horizontal direction a predetermined distance after movement of the load carrier to a first bin in the loading cycle and after completion of the depositing of the load by the load carrier at the first bin, so that in the event that such deposited load is projecting into the travel zone of the load carrier, the sensing means will engage such load and be actuated to thereby cut off the power to the load carrier, and thereby stop any further movement of the load carrier. The invention also provides a novel method of storing a load in an automatic warehousing system to insure that a load deposited at a first bin in a handling cycle has been properly positioned, to thereby prevent damage between the carrier and the load and the storage bin.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a conveying and storage system for handling loads into and from a plurality of storage bins disposed in a tiered arrangement in at least one storage bay, said system including a load carrier movable in a travel zone alongside said bay and adapted for movement through a load handling cycle sequentially to at least two load handling positions, said load carrier comprising conveyor means movable in a first direction including horizontal directions in said travel zone along said bay, and elevator means movable on said conveyor means in a second direction including vertical directions in said travel zone along said bay, load supporting extractor means on said elevator means movable generally transversely of said travel zone and into and out of said bins at each load handling position, for selectively depositing a load into or removing a load from the respective bin at each load handling position, power means for operating said load carrier, circuit means connected to said power means, said circuit means including control means operative to cause energization of said power means and movement of said conveyor means a predetermined distance in one of said horizontal directions, from the first load handling bin position in said load handling cycle, and then to return said conveyor means to said first load handling bin position, after movement of said load carrier to said first load handling bin position in said load handling cycle and completion of the depositing of a load by said load carrier in the associated bin, said predetermined distance movement of said conveyor means being less than the width of said associated bin and always occurring upon depositing of a load by said load carrier at said first bin position, load sensing means mounted on said load carrier, said load sensing means defining a zone through which said extractor means is adapted to extend when depositing a load into or removing a load from a selected storage bin, and other control means in said circuit means operatively coupled to said load sensing means and to said power means, for de-energizing said power means during said predetermined distance movement of said conveyor means to halt movement of said load carrier upon contact between said load sensing means and a load in said associated bin of said storage bay projecting into said travel zone, and said circuit means including means operative to cause said load carrier to move to the second load handling position in said cycle after movement of said conveyor means through said predetermined distance and return to said first bin position in the event that said sensing means does not sense an out-of-position load during said predetermined distance movement.

2. A conveying and storage system in accordance with claim 1 wherein said extractor means comprises an extensible table movable laterally from a generally central position with respect to said conveyor means and into and out of the selected storage bin in the load handling cycle, the first mentioned control means including a time delay relay which is operably coupled to the power means for said conveyor means and which is operative upon energization to cause energization of said power means and thus movement of said conveyor means in said one horizontal direction, said delay relay becoming energized upon said completion of the depositing of the load by said load carrier in said associated bin and return of said extractor means to said generally central position with respect to said conveyor means.

3. A conveying and storage system in accordance with claim 1 wherein said other control means comprises a limit switch operatively coupled to said load sensing means and operably coupled to said power means whereby if said load sensing means engages a protruding load during said predetermined distance movement of said conveyor means, said switch is tripped to stop application of power to said power means.

4. A conveying and storage system in accordance with claim 1 wherein said storage bins each have an open load receiving end defining a plane with said travel zone being disposed alongside said plane, said load carrier being movable parallel with said plane in said travel zone for delivering a load to or returning a load from any selected one of said bins, said load sensing means comprising a frame movably mounted on said elevator means beyond the side of said elevator means and parallel with and adjacent to said plane for sweeping across said plane as said conveyor means moves in said one horizontal direction, and adapted for striking a load projecting out of the associated storage bin after disposal of a load therein by said load carrier, said other control means including a limit switch mounted on said elevator means and operatively coupled to said frame whereby when said switch is tripped said power means is de-energized and said load carrier stops, said frame being mounted on said elevator means for movement in its own plane relative to said elevator means.

5. A conveying and storage system in accordance with claim 1 wherein the first mentioned control means is operative to cause said power means which drives said conveyor means to be energized in the reverse direction during said predetermined distance movement as compared to the direction of energization of the last mentioned power means for moving said load carrier to said first load handling bin position.

6. A conveying and storage system in accordance with claim 1 wherein said sensing means comprises an inverted generally U-shaped frame mounted on said elevator means at a side thereof and in confronting relation to the load receiving ends of said bins, and mounting means extending laterally from said elevator means and movably mounting said sensing frame thereon, said other control means being moutned on said elevator means and being operatively coupled to said sensing frame.

7. A conveying and storage system in accordance with claim 6 wherein said elevator means comprises a generally U-shaped member in side elevation with said extractor means being mounted for lateral extension on the base portion of said U-shaped member, said inverted U-shaped sensing frame being disposed laterally outwardly of said U-shaped elevator member and defining said zone through which said extractor means is adapted to extend when depositing or removing a load from the selected storage bin, said mounting means including a bracket extending laterally from said side of said U-shaped elevator member, said inverted U-shaped sensing frame having a generally horizontally extending mounting rod projecting generally longitudinally therefrom in the plane of said sensing frame, said mounting rod being loosely supported by said bracket for movement of said sensing frame with respect to said bracket, and resilient means coacting with said mounting rod and resiliently holding said sensing frame with respect to said bracket.

8. In a method of storing a load in an automatic warehousing system which includes a storage frame comprising a plurality of storage bins disposed in superimposed relation and a powered load carrier which is adapted for movement adjacent said load bins through a load handling cycle sequentially to at least two load handling positions, the steps of moving the load carrier with a load thereon to a first bin in the handling cycle, depositing the load from the load carrier in the first bin, providing load sensing means on the load carrier for sensing if the load projects out into the travel zone of the load carrier, moving the load carrier horizontally a predetermined distance less than the width of said first bin immediately subsequent to the depositing of the load in the first bin for causing actuation of the load sensing means if the load in the first bin projects into said travel zone, stopping the movement of the load carrier upon actuation of the load sensing means due to the load projecting into said travel zone if the latter occurs, and moving said load carrier horizontally back in the reverse direction the same distance of movement as said predetermined distance at the completion of the latter in the event that no actuation of said load sensing means occurs during movement of said load carrier said predetermined distance, and then moving said load carrier to the next load handling position in said cycle.

9. A method in accordance with claim 8 wherein said predetermined horizontal movement of the load carrier occurs while vertical movement of the load carrier simultaneously occurs in the movement of the load carrier to its second load handling position in the loading cycle, said second load handling position being disposed vertically above the first load handling position.

References Cited

UNITED STATES PATENTS

| 664,293 | 12/1900 | Roth et al. | 18—41 |
| 1,554,584 | 9/1925 | Lake | 214—16.1 |
| 2,451,368 | 10/1948 | White et al. | 214—16.4 |
| 3,206,041 | 9/1965 | McGrath | 214—16.4 |
| 3,323,661 | 6/1967 | Chasar | 214—16.4 |

GERALD M. FORLENZA, *Primary Examiner.*

R. J. SPAR, *Assistant Examiner.*

U.S. Cl. X.R.

187—41